US012479071B2

(12) United States Patent
Chen et al.

(10) Patent No.: US 12,479,071 B2
(45) Date of Patent: Nov. 25, 2025

(54) HAND TOOL AND METHOD FOR MANUFACTURING THE SAME

(71) Applicants: MING SHIN TOOLS CO., LTD., Taichung (TW); YUNGFONG TOOLS CO., LTD., Taichung (TW)

(72) Inventors: Yung-Shun Chen, Taichung (TW); Tzu-Chun Chen, Taichung (TW)

(73) Assignees: MING SHIN TOOLS CO., LTD., Taichung (TW); YUNGFONG TOOLS CO., LTD., Taichung (TW)

(*) Notice: Subject to any disclaimer, the term of this patent is extended or adjusted under 35 U.S.C. 154(b) by 510 days.

(21) Appl. No.: 17/990,956

(22) Filed: Nov. 21, 2022

(65) Prior Publication Data

US 2024/0165772 A1 May 23, 2024

(51) Int. Cl.
*B25B 13/08* (2006.01)
*B25B 13/04* (2006.01)
*B25B 13/06* (2006.01)

(52) U.S. Cl.
CPC .............. *B25B 13/08* (2013.01); *B25B 13/06* (2013.01); *B25B 13/04* (2013.01)

(58) Field of Classification Search
CPC ....... B25B 13/04; B25B 13/06; B25B 13/065; B25B 13/08; G03F 3/00; Y10T 29/49764; Y10T 29/49885
See application file for complete search history.

(56) References Cited

U.S. PATENT DOCUMENTS 4,100,824 A * 7/1978 Marschke ............. B25B 13/065 81/124.6
2005/0193874 A1* 9/2005 Shih ........................ B25B 13/56 81/121.1

OTHER PUBLICATIONS

ISO 691—Table 1 Tolerances on wrench and socket openings (Year: 2005).*
ASME Standards—Appendix III—Wrench Openings for Square and Hex Nuts (Year: 2003).*

* cited by examiner

*Primary Examiner* — C. A. Rivera
(74) *Attorney, Agent, or Firm* — MUNCY, GEISSLER, OLDS & LOWE, P.C.

(57) ABSTRACT

A hand tool and a method for manufacturing the same are provided. The method for manufacturing the hand tool includes following steps of: determining a target size according to a first standard range and a second standard range; and forming a hand tool body according to the target size. The hand tool body includes an opening and a plurality of sidewalls defining the opening, and a distance between two said sidewalls radially opposite to each other corresponds to the target size.

7 Claims, 4 Drawing Sheets

HAND TOOL AND METHOD FOR MANUFACTURING THE SAME

BACKGROUND OF THE INVENTION

Field of the Invention

The present invention relates to a hand tool and method for manufacturing the same.

Description of the Prior Art

Hand tools, such as open-end wrenches, closed-end wrenches, torx wrenches, ratchet wrenches, sockets, are provided with at least one opening configured to be sleeved with a fastener, and a size of each of said opening is conformed with a metric size or an imperial size so as to apply to the fastener to be rotated. The conventional fasteners have various sizes in the metric standard and the imperial standard, and a conventional hand tool is suitable to use in two sizes of the fasteners at most. Therefore, the operator has to prepare a number of hand tools of different specifications or sizes for operation, which is inconvenient to carry and high cost.

To dissolve the problem as described above, a hand tool with an opening suitable for two different sizes of fasteners are provided, and the opening is defined by a plurality of sidewalls processed with convex surfaces, engaging grooves, abutting surface, or the like, which has a complicate structure and a high processing cost, and the fasteners are easy to deform or disengage therefrom due to small contact area.

The present invention is, therefore, arisen to obviate or at least mitigate the above-mentioned disadvantages.

SUMMARY OF THE INVENTION

The main object of the present invention is to provide a hand tool and method for manufacturing the same, and the hand tool is suitable to fasteners in different sizes and has a simple structure and is easy to manufacture.

To achieve the above and other objects, the present invention provides a method for manufacturing a hand tool, including following steps of: determining a target size according to a first standard range and a second standard range; and forming a hand tool body according to the target size. The hand tool body includes an opening and a plurality of sidewalls defining the opening, and a distance between two said sidewalls radially opposite to each other corresponds to the target size. One of the first standard range and the second standard range is a metric size range, and the other of the first standard range and the second standard range is an imperial size range. The first standard range includes a first upper limit value and a first lower limit value, and the second standard range includes a second upper limit value and a second lower limit value. When the first lower limit value is between the second lower limit value and the second upper limit value, the target size is determined to be greater than or equal to the first lower limit value and less than or equal to at least one of the first upper limit value and the second upper limit value. When the first lower limit value is greater than the second lower limit value and the second upper limit value, the target size is determined to be greater than or equal to the first lower limit value and less than or equal to the first upper limit value.

To achieve the above and other objects, the present invention further provides a hand tool, manufactured by the method as described above. The hand tool is a wrench or a socket, and the opening is disposed on one end of the hand tool body and configured to be assembled with a fastener.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
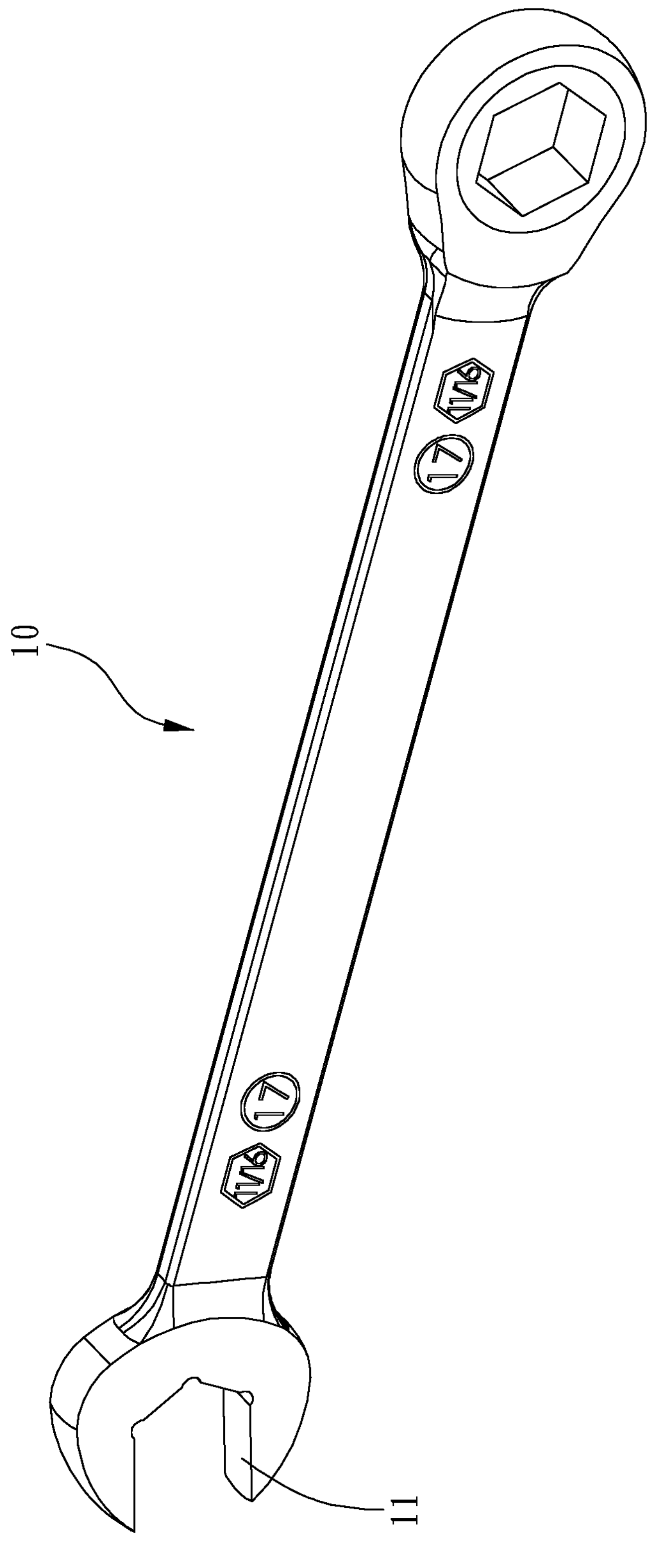
FIG. 1 is a stereogram of a first preferable embodiment of the present invention.
Figure 2:
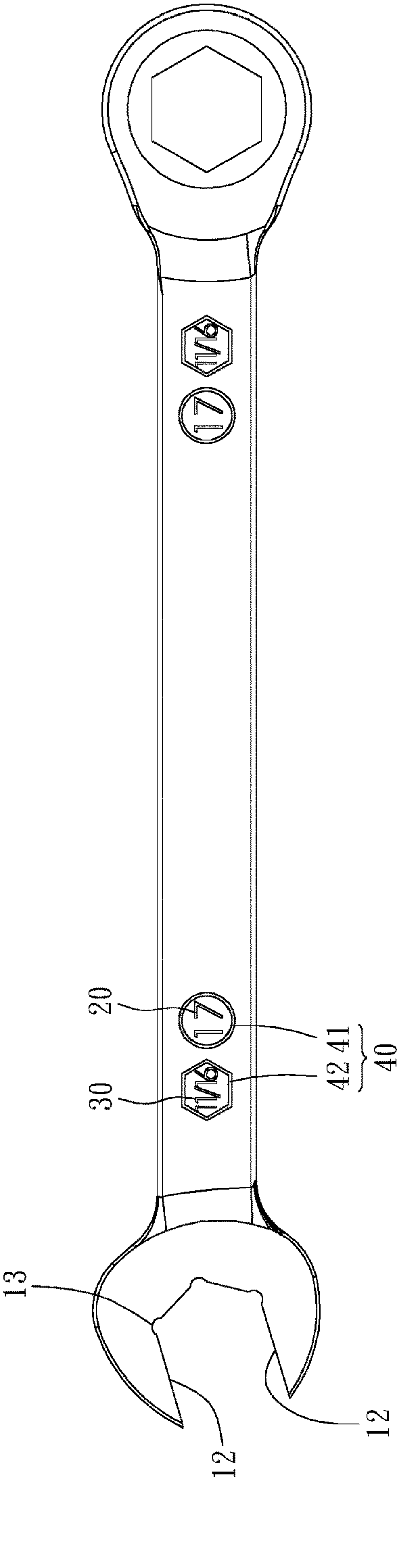
FIG. 2 is a side view of the first preferable embodiment of the present invention.

Please refer to FIGS. 1 to 2 for a first preferable embodiment of the present invention. A method for manufacturing a hand tool of the present invention includes following steps of: determining a target size according to a first standard range and a second standard range; and forming a hand tool body 10 according to the target size.

One of the first standard range and the second standard range is a metric size range, and the other of the first standard range and the second standard range is an imperial size range. The first standard range includes a first upper limit value and a first lower limit value, and the second standard range includes a second upper limit value and a second lower limit value. When the first lower limit value is between the second lower limit value and the second upper limit value, the target size is determined to be greater than or equal to the first lower limit value and less than or equal to at least one of the first upper limit value and the second upper limit value. When the first lower limit value is greater than the second lower limit value and the second upper limit value, the target size is determined to be greater than or equal to the first lower limit value and less than or equal to the first upper limit value. The hand tool body 10 includes an opening 11 and a plurality of sidewalls 12 defining the opening 11, and a distance between two said sidewalls 12 radially opposite to each other corresponds to the target size. Therefore, the opening 11 can be used for fasteners in both the metric standard and the imperial standard, and the hand tool is convenient to process and provides wide range of applications and good operating stability.

In this embodiment, the first standard range is the imperial size range, and the second standard range is the metric size range. Take size 11/16" and size 17 mm as an example, the imperial size range conforming to the standard is between 17.51 mm (the first lower limit value) and 17.76 mm (the first upper limit value), and the metric size range conforming to the standard is between 17.05 mm (the second lower limit value) and 17.30 mm (the second upper limit value). The target size may be determined between 17.51 mm and 17.76 mm (such as 17.67 mm) so that the opening 11 is conformed to the imperial size range and can be used for the fastener in size 11/16"; the target size is close to the metric size range so that the opening 11 is also usable for the fastener in size 17 mm, which is convenient to manufacture.

Preferably, when the target size is within the first standard range and outside of the second standard range, a difference between the target size and the second lower limit value is less than or equal to 0.8 mm. When the first lower limit value is greater than the second lower limit value and the second upper limit value, a difference between the first lower limit value and the second upper limit value is less than or equal to 0.4 mm, which avoids large size difference and allows the plurality of sidewalls 12 to be stably abutted against the fastener. Specifically, the method for manufacturing the hand tool is to form the distance between the two said sidewalls 12 to be the same with the target size, which allows the two said sidewalls 12 to be stably abutted against the fasteners with different sizes. The plurality of sidewalls 12 are unnecessary to be further processed and can provide stable abutment with the fastener so as to have good operation effect.

The method for manufacturing the hand tool further includes a step of arranging a first size mark 20 corresponding to the metric size range and a second size mark 30 corresponding to the imperial size range on the hand tool body 10. The first size mark 20 and the second size mark 30 respectively include at least one of characters, numbers and patterns, as shown in FIGS. 1 and 2, which is convenient to use. Preferably, the method for manufacturing the hand tool further includes a step of arranging at least one recognition structure 40 on the hand tool body 10. When the target size is within the metric size range, one of the at least one recognition structure 40 is arranged adjacent to or at the first size mark 20. When the target size is within the imperial size range, one of the at least one recognition structure 40 is arranged adjacent to or at the second size mark 30 so as to show the standard size to which the opening 11 conforms. In this embodiment, the at least one recognition structure 40 includes a first recognition portion 41 corresponding to the first size mark 20 and a second recognition portion 42 corresponding to the second size mark 30. The first recognition portion 41 and the second recognition portion 42 respectively include a pattern with a round, oval or polygonal shape. When the target size is within one of the metric size range and the imperial size range and outside of the other of the metric size range and the imperial size range, the first recognition portion 41 is different from the second recognition portion 42, such as hexagonal borders and round borders shown in FIGS. 1 and 2. Shapes of the first recognition portion 41 and the second recognition portion 42 are different to each other so that it is convenient to know that a size of the opening 11 is conformed to the imperial size range of size 11⁄16" and also conformed to the metric size range of size 17 mm. In other embodiment, the at least one recognition structure may include patterns, concave or convex structures, color blocks, colored text, or the like. For example, one of the first and the second size marks conformed to the standard may include a red pattern, and one of the first and the second size marks non-conformed to the standard may include a green pattern; one of the first and the second size marks conformed to the standard may include a round border, and one of the first and the second size marks non-conformed to the standard may have no border.

The method for manufacturing the hand tool further includes step of forming a plurality of notches 13 communicated with the opening 11, and each of the plurality of notches 13 is located between adjacent two of the plurality of sidewalls 12, which is convenient to be assembled with the fastener and prevents corners of the fastener from abrasion.

Figure 3:
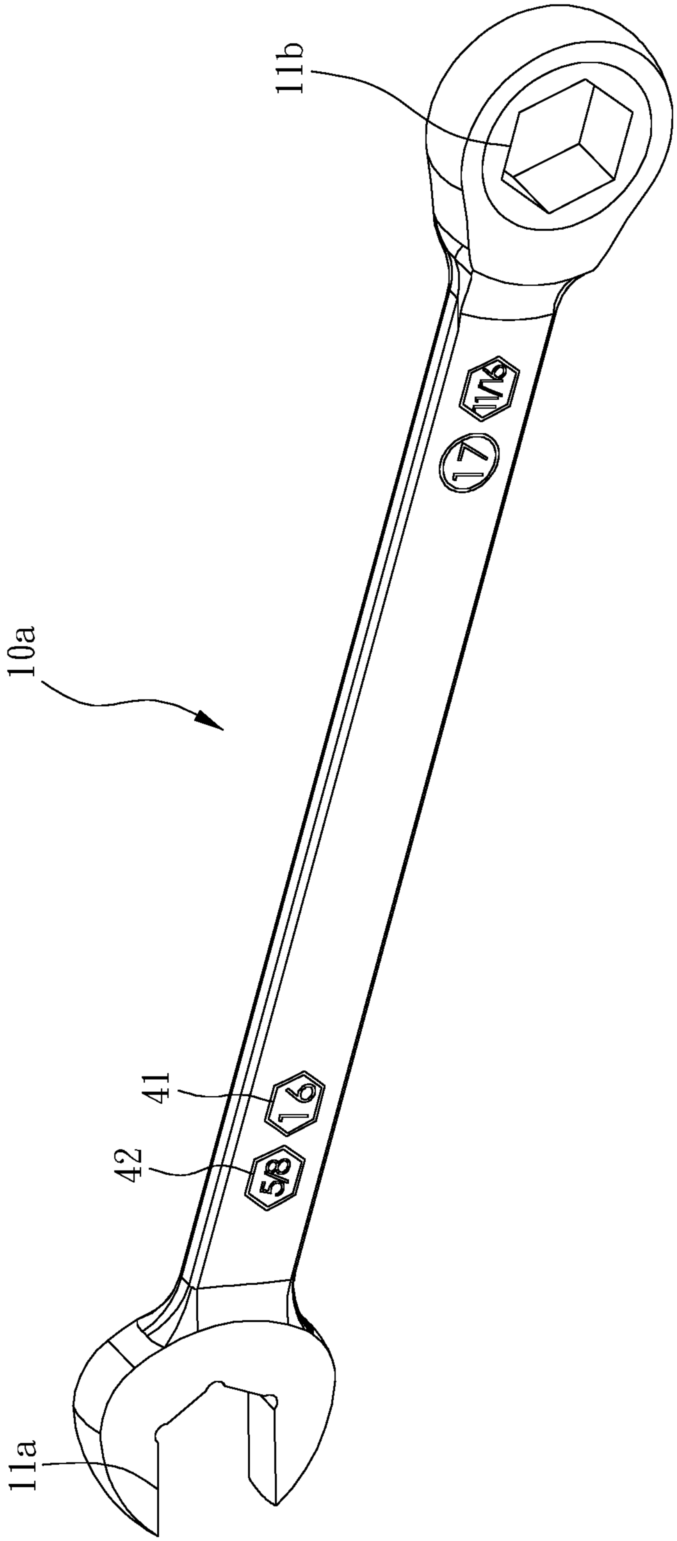
FIG. 3 a stereogram of a second preferable embodiment of the present invention.

Please refer to FIG. 3 for a second preferable embodiment of the present invention. When the first lower limit value is between the second upper limit value and the second lower limit value, the target size is determined to be between the first lower limit value and the second upper limit value. In this embodiment, the first standard range is the metric size range, and the second standard range is the imperial size range. Take size ⅝" and size 16 mm as an example, the imperial size range conforming to the standard is between 15.91 mm (the second lower limit value) and 16.16 mm (the second upper limit value), and the metric size range conforming to the standard is between 16.05 mm (the first lower limit value) and 16.27 mm (the first upper limit value). The target size may be determined between 16.05 mm 16.16 mm (such as 16.15 mm) so that the opening 11*a* is conformed to both the imperial size range and the metric size range, which has a wide range of applications. When the target size is respectively within the metric size range and the imperial size range, the shapes of the first recognition portion 41 and the second recognition portion 42 are the same so as to represent that the opening 11*a* is conformed to two respective sizes. The hand tool body 10*a* may include a plurality of the opening 11*a*, 11*b*, shapes, size and types of said openings 11*a*, 11*b* may be identical to or different from one another.

Figure 4:
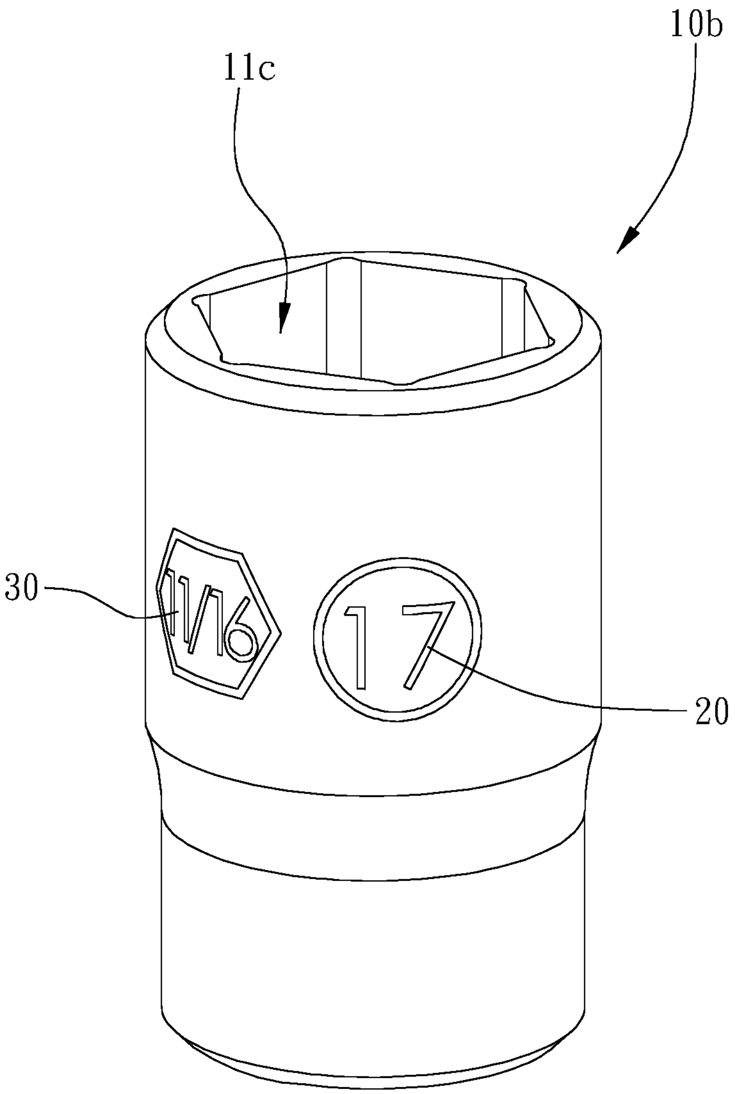
FIG. 4 is a stereogram of a third preferable embodiment of the present invention.

The present invention further provides a hand tool, manufactured by the method as described above. The hand tool may be a wrench (as shown in FIGS. 1-3) or a socket (as shown in FIG. 4), and the opening 11, 11*a*, 11*b*, 11*c* is disposed on one end of the hand tool body 10, 10*a*, 10*b*. The distance between the two said sidewalls 12 is between a lower limit value of one of the metric size range and the imperial size range and an upper limit value of the other of the metric size range and the imperial size range so that the opening 11*a* is conformed to both the imperial size range and the metric size range.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A method for manufacturing a hand tool, including following steps of:

determining a target size according to a first standard range and a second standard range; and forming a hand tool body according to the target size, wherein the hand tool body includes an opening and a plurality of sidewalls defining the opening, and a distance between two said sidewalls radially opposite to each other corresponds to the target size;

wherein one of the first standard range and the second standard range is a metric size range, and the other of the first standard range and the second standard range is an imperial size range; the first standard range includes a first upper limit value and a first lower limit value, the second standard range includes a second upper limit value and a second lower limit value; when the first lower limit value is between the second lower limit value and the second upper limit value, the target size is determined to be greater than or equal to the first lower limit value and less than or equal to at least one of the first upper limit value and the second upper limit value; when the first lower limit value is greater than the second lower limit value and the second upper limit value, the target size is determined to be greater than or equal to the first lower limit value and less than or equal to the first upper limit value;

wherein the method for manufacturing the hand tool further includes a step of arranging a first size mark corresponding to the metric size range and a second size mark corresponding to the imperial size range on the hand tool body, wherein the first size mark and the second size mark respectively include at least one of characters, numbers and patterns;

wherein the method for manufacturing the hand tool further includes a step of arranging a first recognition portion corresponding to the first size mark and a second recognition portion corresponding to the second size mark on the hand tool body, wherein when the target size is within one of the metric size range and the imperial size range and outside of the other of the metric size range and the imperial size range, the first recognition portion is different from the second recognition portion.

2. The method for manufacturing the hand tool of claim 1, wherein when the target size is within the first standard range and outside of the second standard range, a difference between the target size and the second lower limit value is less than or equal to 0.8 mm.

3. The method for manufacturing the hand tool of claim 1, wherein when the first lower limit value is greater than the second lower limit value and the second upper limit value, a difference between the first lower limit value and the second upper limit value is less than or equal to 0.4 mm.

4. The method for manufacturing the hand tool of claim 1, wherein when the target size is within the first standard range and outside of the second standard range, a difference between the target size and the second lower limit value is less than or equal to 0.8 mm; the method for manufacturing the hand tool further includes step of forming a plurality of notches communicated with the opening, each of the plurality of notches is located between adjacent two of the plurality of sidewalls; when the target size is within the metric size range and the imperial size range, shapes of the first recognition portion and the second recognition portion are the same; when the target size is within one of the metric size range and the imperial size range and outside of the other of the metric size range and the imperial size range, the shapes of the first recognition portion and the second recognition portion are different; and the first recognition portion and the second recognition portion respectively include a pattern with a round, oval or polygonal shape.

5. The method for manufacturing the hand tool of claim 1, wherein when the first lower limit value is between the second upper limit value and the second lower limit value, the target size is determined between the first lower limit value and the second upper limit value.

6. A hand tool, manufactured by the method of claim 1, wherein the hand tool is a wrench or a socket, and the opening is disposed on one end of the hand tool body and configured to be assembled with a fastener.

7. The hand tool of claim 6, wherein the distance is between a lower limit value of one of the metric size range and the imperial size range and an upper limit value of the other of the metric size range and the imperial size range.

* * * * *